United States Patent Office 3,143,746
Patented Aug. 11, 1964

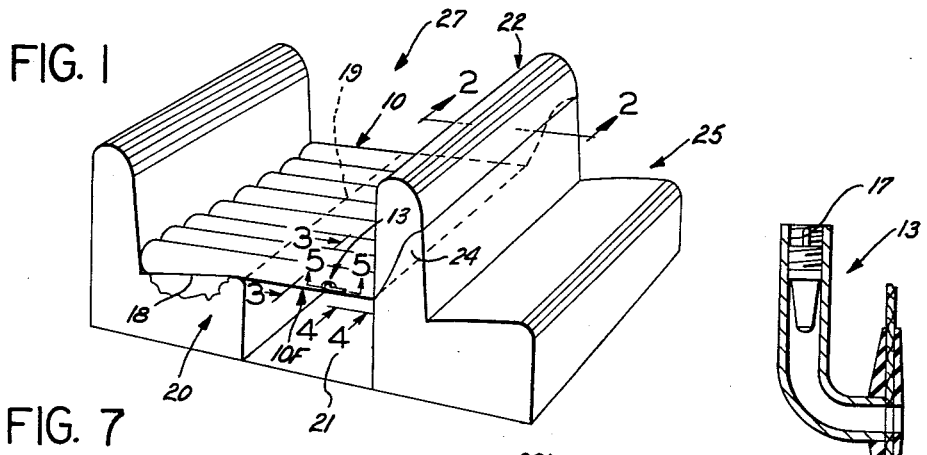
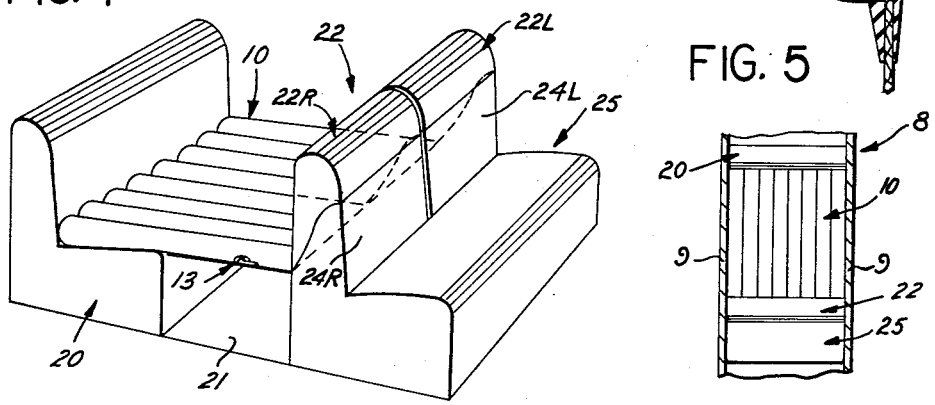
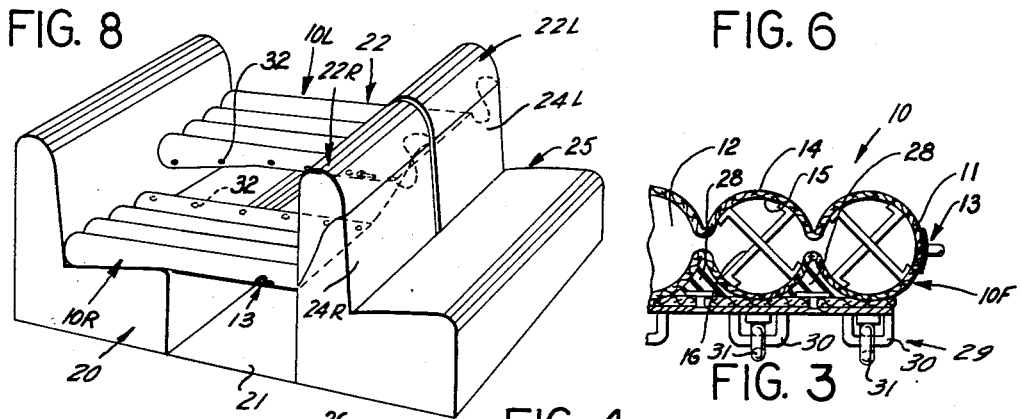
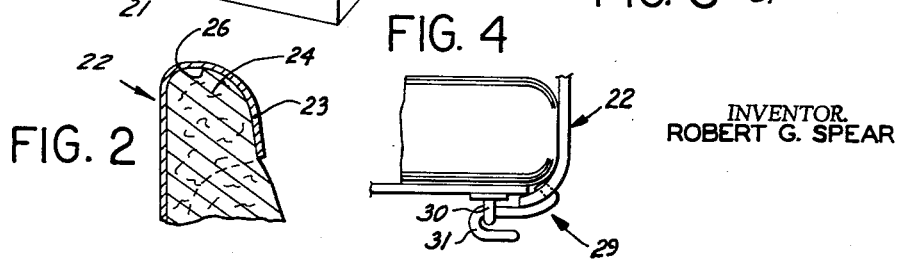

3,143,746
CONTROLLABLY EFFECTIVELY COLLAPSIBLE AND FOLDABLE CHILD SUPPORT PLATFORM FOR A SEAT AREA OF A VEHICLE
Robert G. Spear, Canoga Park, Calif.
(1648 Cochran, Simi, Calif.)
Filed Oct. 25, 1961, Ser. No. 147,623
6 Claims. (Cl. 5—94)

Generally speaking, the present invention relates to a controllably effectively collapsible platform adapted to be quickly and easily set up so as to overlie a seat area of a vehicle (usually the back seat are of an automobile and so described hereinafter for exemplary but not limiting purposes) whereby to provide an effective false bottom for said seat area which will effectively support a child over the entire false bottom so that the child can play thereon or sleep thereon and will be effectively retained on said effective false bottom or platform by reason of the enclosing portions of the vehicle therearound (in the case of a back seat area of an automobile, by the rear and side wall portions of the vehicle surrounding same and the rear surface of the back of the front seat in front of said area).

An important feature of the support platform of the present invention is the effectively collapsible nature of it which makes it possible to effectively collapse it into an extremely small space volume for ready storage and portability during non-use periods and yet which makes it possible to effectively expand it into a use configuration for installation in overlying relationship with respect to the vehicle seat area (in a preferred form, the back seat area of an automobile) for the purposes briefly outlined above.

In one preferred form of the invention, the effectively collapsible and expandable feature is provided by making the platform means of an inflatable type comprising a thin-sheet enclosing means defining interior chamber means and adapted to have a fluid under pressure introduced thereinto for the controllable inflation of the platform means from a small-volume, collapsed, storage configuration into a fully expanded and substantially horizontally directed configuration for use within and overlying a seat area or portion of a motor vehicle (usually the rear seat portion of an automobile).

In the specific preferred form referred to in the preceding paragraph, the platform means is provided with a rear downwardly facing seat-abutment surface portion adapted to rest upon and abut the upper surface of an automobile seat (usually a rear seat or the like) and has a forward portion provided with support means and engaging means for controllably removable engagement with a support portion of an automobile or motor vehicle adjacent to said forward portion of said platform means whereby to effectively support same.

In one specific preferred form of the invention wherein the platform means is adapted to rest upon an automobile rear seat with the forward portion extending beyond said rear seat over the region in which the lower legs of a person seated on the seat normally extend downwardly, said forward support means and engaging means may comprise tensile support means taking the form of an effective slip-cover of thin-sheet flexible material adapted to slip over and engage a top portion of the back part of a front seat of the automobile whereby to firmly support said forward portion of said platform means in a readily disengageable and easily foldable and collapsible manner.

In certain forms of the version of the invention mentioned above, quick engageable and disengageable or quick connect and disconnect means may be interposed between the forward portion of the platform means to and the tensile support means whereby to allow them be effectively connected and/or disconnected relative to each other, as desired.

Also in certain forms of the apparatus of the present invention, said platform means and/or the front positioned tensile support means may comprise individual or multiple sections (usually two laterally adjacent sections) and in certain forms may be provided with means for controllably fastening them in side-by-side, substantially laterally adjacent, mounted relationship with respect to each other when in a use position and for controllable removal of either of said platform sections and/or the corresponding front support means section when desired whereby to provide an effective false bottom for only a portion of (usually substantially one-half of) the automobile rear seat area while leaving the other portion of the rear seat area open and unencumbered for conventional use.

In certain forms of the present invention, the inflatable platform means may be provided with longitudinal stiffening rib means to increase the stiffness thereof—particularly the stiffness thereof at the forward end which is positioned forward of the rear seat of the automobile and is not given underlying support thereby.

Also in one specific preferred form of the invention, the inflatable platform means may be provided with one or more controllably operable means (usually check valve means, although not specifically so limited) for the controllable ingress or introduction of pressurized fluid (usually pressurized air, although not specifically so limited) into the interior thereof for expansion purposes and for the controllable egress thereof for collapsing purposes. This is also true of the multiple section form of the platform means wherein each section may be provided with such controllably operable ingress and egress means. In certain forms, the ingress and egress means may comprise the same structure operable in two different manners so as to effectively comprise ingress means when operated in one manner and egress means when operated in another manner.

Also in one preferred form of the invention the platform means, or each of the multiple sections thereof, is provided with longitudinally directed, substantially parallel, fluted or convoluted portions formed in the enclosing thin-sheet material defining the hollow platform means whereby to effectively provide a plurality of hollow tubular inner portions of flexible construction for maintaining a substantially constant vertical dimension of the platform means when fully expanded.

It is an object of the present invention to provide a novel support platform for an interior seat area of a motor vehicle of the character referred to above, in any of the generic or specific aspects referred to above, and adapted for quick and easy effective expansion into a use configuration overlying an interior motor vehicle seat area (or a portion thereof) whereby to provide an effective overyling false bottom of a soft resilient nature, and with the entire apparatus being very quickly and easily effectively collapsible into a very small volume configuration for ready storage and/or portability during non-use periods.

It is a further object of the present invention to provide a novel support platform of the character referred to above which is of extremely simple, cheap, easy-to-install, easy-to-remove, and foolproof construction such as to be conducive to widespread use thereof.

Further objects are implicit in the detailed description which follows hereinafter and which is to be considered as exemplary of, but not specifically limiting the invention, and said objects will be apparent to persons skilled in the art after a careful study of the detailed description which follows hereinafter.

For the purpose of clarifying the nature of the present vention, several exemplary embodiments are illustrated in the hereinbelow-described figures of the accompanying drawings and are described in detail hereinafter.

FIG. 1 is a fragmentary, partly broken-away perspective view of one exemplary form of the present invention in mounted relationship with respect to an automobile rear seat area and with the forward portion supported by the back of the automobile front seat in a readily removable manner.

FIG. 2 is an enlarged fragmentary cross-sectional view taken in the direction of the arrows 2—2 of FIG. 1 illustrating the slip-cover type of engaging means comprising a part of the tensile support means carrying the forward end of the platform by reason of slipover engagement with the top of the back portion of the automobile front seat.

FIG. 3 is an enlarged fragmentary sectional view taken in the direction of the arrows 3—3 of FIG. 1 and shows one exemplary interior construction of the inflatable mattress means and also a portion of one exemplary form of the novel controllably engageable and disengageable quick connect and disconnect means for quickly fastening the forward slip-cover support to the rear inflatable mattress portion, when desired.

FIG. 4 is a fragmentary side elevational view taken in the direction of the arrows 4—4 of FIG. 1 and shows the detail of the exemplary controllably engageable and disengageable quick connect and disconnect means shown partially in FIG. 3.

FIG. 5 is a fragmentary view taken in the direction of the arrows 5—5 of FIG. 1 and illustrates the detail of one exemplary combined form of the controllably engageable ingress and egress means for the controllable forcible introduction of pressurized fluid (usually air) into the interior of the inflatable mattress for inflating same and for the controllable exhausting of said pressurized fluid therefrom, when desired. As shown in FIG. 5, said controllably operable ingress and egress means takes the form of a check valve.

FIG. 6 is a diagrammatic, reduced-size top plan view of FIG. 1, additionally including fragmentary side wall portions of the automobile (shown in simplified diagrammatic form).

FIG. 7 is a view similar to FIG. 1 but illustrates a slightly modified form of the invention wherein the slip-cover means for slipover engagement with the top of the back part of the automobile front seat is slightly different than in the first form of the invention illustrated in FIG. 1 since said front seat back portion is of the split type.

FIG. 8 is a view generally similar to FIGS. 1 and 7, but illustrates a further modification of the invention wherein the inflatable platform means takes the form of two laterally adjacent and individually removable sections which are shown as provided with controllably engageable fastening means for fastening them in side-by-side relationship, when desired. In this view one of said sections is shown in upwardly displaced relationship from its true rest position. This is done for reasons of drawing clarity.

It should be noted that in each of FIGS. 1, 7, and 8, the portions of a surrounding motor vehicle or automobile carrying the front and rear seats are completely removed for drawing simplification reasons. However, it should be understood that they should be considered as being present as they would be in an actual installation of the present invention. This is shown diagrammatically in FIG. 6 wherein side wall portions 9 of an automobile 8 are shown fragmentarily in simplified diagrammatic form.

Referring to FIGS. 1-6 for exemplary purposes, one illustrative embodiment of the invention takes a typical exemplary form wherein it comprises an inflatable platform means, indicated generally at 10, which is made of any suitable flexible material adapted to hold pressure.

For example, it may be an elastomeric material such as plastic or the like, a fabric material of a rubber or plastic coated type so as to be capable of holding air under pressure, or any other suitable equivalent thin-sheet material of a non-leaking type having a thin-sheet enclosing means 11 (best shown in FIG. 3) defining interior chamber means 12 and being provided with means, such as indicated generally at 13, for introducing thereinto a fluid under pressure for the controllable inflation of the entire platform means 10 from a small volume collapsed storage configuration (not shown) into a fully expanded configuration such as is clearly shown in FIG. 1 and fragmentarily shown in FIG. 3.

In the specific example illustrated, the thin-sheet enclosing means 11 defining the hollow interior 12 of the platform means 10 is arranged in a plurality of longitudinally directed, substantially parrallel fluted or convoluted portions 14 formed therein and defining a plurality of hollow tubular inner portions 15 of flexible construction maintained in said configuration by inner reinforcing means 16 whereby to cause the entire hollow platform means 10 to maintain at any given cross-section thereof a substantially constant vertical dimension when fully expanded. This is an exemplary arrangement only and may be modified substantially within the spirit and scope of the present invention.

In the specific example illustrated in FIGS. 1-6, the means for introducing a pressurized fluid into the interior chamber 12 is indicated at 13 as previously mentioned and takes the form of a check valve means shown in greater detail in FIG. 5. Said ingress and egress or check valve means 13 is shown, for exemplary purposes, as being of a type adapted to be normally closed (under the action of a biasing spring, which is not shown since it is well known in the art) except when the actuating rod 17 is depressed, at which time the check valve means is forcibly held in open position to allow either the introduction of air into the hollow interior chamber 12 or the emission of air therefrom.

Since the check valve 13 is of a conventional type, the detailed interior construction thereof is not illustrated in the figures because it would be completely redundant. However, in this connection it should be noted that the invention is not limited to the particular conventional type of check valve illustrated in FIG. 5. Actually, any type of controllably operable ingress and/or egress means (either together or separately located) may be employed within the spirit and scope of the present invention as a full functional equivalent to the specific one illustrated at 13 in FIG. 5.

It should be noted that the platform means 10 has a rear, downwardly facing or directed, seat-abutment surface portion 18 adapted to rest upon and abut the upper surface 19 of an automobile rear seat, indicated generally at 20, and has a forward portion 10F which extends forwardly of the rear seat 20 over the open region 21 normally adapted to receive the lower legs and feet portions of persons sitting on the rear seat 20.

In the specific example illustrated in FIGS. 1-6, the forward portion 10F of the platform means is provided with tensile support means, indicated generally at 22, having engaging means 23 adapted for controllably removable engagement with the top portion of the back part 24 of the automobile front seat indicated generally at 25 whereby to firmly support said forward portion 10F of the hollow inflated platform means 10. In the specific example illustrated, said engaging means 23 takes the form of slip-cover means of thin-sheet flexible material defining a downwardly directed concave portion 26 adapted to slip over and positively and firmly receive therein said top portion of said back part 24 of the automobile front seat 25. This provides an arrangement which very effectively supports the entire hollow platform means 10 in a manner effectively providing a false bottom over the entire rear seat area generally designated by the reference numeral 27 so that a baby or small child may be effectively confined and provided with a soft compressible platform means upon which he may play or sleep. This is particularly useful during long trips and the like when an infant will normally tend to become impatient if confined, such as in a baby seat, chair, or the like, and yet is likely to become injured if allowed to roam freely over a conventional automobile seat, either front or back.

The platform means 10 may, in certain forms of the invention, be provided with longitudial stiffening means such as the stiffening ribs shown at 28 in FIG. 3. However, these may be modified substantially and, in certain forms of the invention, where the platform means 10 is inherently of sufficient stiffness in itself, these may be eliminated.

The front support means 22 and the platform means 10 may be flexibly but non-separably connected together in certain forms of the invention and, in other forms of the invention, may include controllably engageable and disengageable quick connect and disconnect means such as indicated generally by the reference numeral 29, interposed between the forward portion 10F of the platform means 10 and the bottom portion of the tensile support means 22 for controlled engagement and disengagement thereof relative to each other. This is best shown in FIG. 4 wherein one specific form of this structure is illustrated for exemplary but not for limiting purposes and shows it as comprising a plurality of substantially U-shaped eye portions 30 carried by the forward portion 10F of the platform means 10 and a plurality of cooperable hooks 31 carried by the bottom of the front or forward support means 22 for controlled engagement and disengagement with respect to the corresponding eyes 30 as clearly shown in FIG. 4. While this particular type of quick connect and disconnect means is effective, the invention is not specifically limited thereto. Actually, various other quick connect and disconnect means may be employed in lieu thereof and, as previously pointed out, the connection may be of a permanent non-separable, although flexible, type in certain other forms of the invention.

FIG. 7 illustrates a form of the invention similar in all respects but one to the first form of the invention illustrated in FIGS. 1-6. Therefore, all of the similar parts are indicated by similar reference numerals. The only difference in this modification of the invention is the fact that the front seat 25 has two separate seat back portions 24L and 24R. Therefore, the support means, indicated generally at 22, actually comprises a left support means 22L and a right support means 22R, each adapted to engage the corresponding front seat back portion 24L or 24R. However, the engagement is otherwise identical to that illustrated in the first form of the invention and described in detail hereinbefore. Therefore, further specific description of this modification is thought to be redundant.

FIG. 8 illustrates a further modification of the invention which is similar in all respects to the form illustrated in FIG. 7 except for the separation of the platform means into left and right portions 10L and 10R which, in the form illustrated in FIG. 8, are provided with controllably operable fastener means 32 for fastening the two platform means sections 10L and 10R in laterally adjacent side-by-side relationship, when desired.

While the fastening means 32 may take a variety of forms, as shown in FIG. 8, they are illustrated as comprising gripper snaps. This is exemplary only and is not to be construed as specifically limiting the invention to such specific fastening means or to the idea of employing such fastening means at all, since in certain forms of the invention they may be eliminated. Otherwise, this modification of the invention is similar to the previously described first and second forms and further specific and detailed description is not given at this point since it is believed that it would be completely redundant in view of the previous full and complete description of the first and second forms of the invention.

It should be noted that the front seat back 24 effectively comprises an auxiliary support portion of the automobile which may assume various other forms in other versions of the invention. Additionally, it should be noted that the support means 22, while shown as being of a tensile type, may actually, in certain forms of the invention, be of a compressive type adapted to underlie the forward portion 10F of a platform means and to support it by underlying contact with the automobile floor. In other words, various types of support for the forward end 10F of a platform means are contemplated and are intended to be included and comprehended within the broad scope of the present invention.

It should be noted that the child support platform of the present invention may be arranged to be made so as to be adaptable for use in a plurality of different automobiles and/or to be made in different sizes and/or shapes so as to individually fit different ones of various different foreign and/or domestic automobiles according to make, model, and year. This may be done in a variety of ways within the broad scope and/or teachings of the present invention, and such arrangements are intended to be included and comprehended herein.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A controllably effectively collapsible and foldable child support platform for a rear seat area of a motor vehicle, comprising: controllably inflatable and deflatable hollow platform means comprising thin-sheet enclosing means of flexible air-impervious thin-sheet material defining a hollow interior chamber means within said platform means capable of holding air under pressure, said platform means being of substantially rectangular configuration as seen in top plan view and having a rear downwardly facing seat-abutment surface portion adapted to rest upon and abut the upper surface of the rear seat of an automobile, said platform means having a forward portion extending forwardly of said rear downwardly facing seat-abutment surface portion to an extent such as to be adapted to be positioned forwardly of said upper surface of said automobile rear seat over an open region forwardly of said automobile rear seat and normally adapted to receive the lower legs and feet portions of persons sitting on said rear seat, said forward portion of said platform means being provided along the front edge thereof with forward support and engaging means comprising upwardly directed tensile support means taking the form of an effective slip-cover engaging means of thin-sheet flexible material defining an effectively downwardly concave receiving means effectively comprising a downwardly directed receiving recess shaped in a manner corresponding to the upwardly directed shape of a corresponding top portion of an automobile front seat for slip-over engagement therewith whereby to effectively support said forward portion of said platform means over said open region, said thin-sheet enclosing means comprising said hollow inflatable platform means being provided with controllably operable valve means for introducing a fluid under pressure into said interior chamber means for inflating said platform means and for removing said fluid from said interior chamber means for effectively collapsing said hollow platform means.

2. A device as defined in claim 1, wherein said hollow platform means is longitudinally provided, in a longitudinal direction between the rear portion of said platform means and the forward portion thereof, with a plurality of longitudinal stiffening rib means extending forwardly in supporting and stiffening relationship with respect to said forward portion of said platform means adapted to be positioned over said open region whereby to stiffen and support same thereover by effective beam action between said rear downwardly facing seat-abutment surface portion of said platform means, which is adapted to be supported by said automobile rear seat, and said front edge of said forward portion of said platform means adapted to be supported by said tensile support means comprising said downwardly concave slip-cover engaging means adapted to receive and be firmly mounted on a correspondingly convexly shaped top portion of said automobile front seat.

3. A device as defined in claim 1, wherein said hollow platform means is longitudinally provided, in a longitudinal direction between the rear portion of said platform means and the forward portion thereof, with a plurality of longitudinal stiffening rib means extending forwardly in supporting and stiffening relationship with respect to said forward portion of said platform means adapted to be positioned over said open region whereby to stiffen and support same thereover by effective beam action between said rear downwardly facing seat-abutment surface portion of said platform means, which is adapted to be supported by said automobile rear seat, and said front edge of said forward portion of said platform means adapted to be supported by said tensile support means comprising said downwardly concave slip-cover engaging means adapted to receive and be firmly mounted on a correspondingly convexly shaped top portion of said automobile front seat, said longitudinal stiffening rib means comprising a plurality of laterally spaced substantially parallel longitudinal stiffening ribs extending longitudinally along substantially the complete length of said platform means but having portions coextensive with said forward portion of said platform means adapted to lie over said open region which are of greater stiffness than rear portions of said longitudinal stiffening rib means coextensive with said rear downwardly facing seat-abutment surface portion of said platforms means which is adapted to be supported upon the automobile rear seat.

4. A device as defined in claim 1, including controllably engageable and disengageable quick connect and disconnect means effectively interposed between said forward portion of said platform means and the bottom portion of said upwardly directed tensile support means.

5. A device as defined in claim 1, including controllably engageable and disengageable quick connect and disconnect means effectively interposed between said forward portion of said platform means and the bottom portion of said upwardly directed tensile support means, said quick connect and disconnect means comprising a plurality of hook and eye means laterally spacedly located with respect to said forward portion of said platform means and said bottom portion of said tensile support means, with each hook and eye means including a hook portion and an eye portion cooperably and removably connected together and carried by the corresponding adjacent bottom portion of said tensile support means and forward portion of said platform means for controllable quick connection and disconnection as desired.

6. A device as defined in claim 1, wherein said hollow inflatable platform means effectively comprises two laterally adjacent similar hollow inflatable platform portions provided with controllably operable fastener means controllably disengageably interconnecting same in laterally adjacent side-by-side relationship, the rear downwardly facing seat-abutment surface portion of each of said hollow platform portions being substantially coextensive with respect to, and adapted to rest upon, only a corresponding left or right half of the upper surface of the automobile rear seat.

References Cited in the file of this patent
UNITED STATES PATENTS

| | | |
|---|---|---|
| 2,348,217 | Jones | May 9, 1944 |
| 2,648,072 | De Blieux | Aug. 11, 1953 |
| 2,748,401 | Winstead | June 5, 1956 |

FOREIGN PATENTS

| | | |
|---|---|---|
| 331,459 | Switzerland | Sept. 15, 1958 |